United States Patent [19]

Bratland

[11] 3,716,378
[45] Feb. 13, 1973

[54] PREPARATION OF FOODSTUFFS CONTAINING A HIGH CONTENT OF EMULSIFIED FAT

[76] Inventor: Arthur Bratland, Maudsvei 9, Heie, Notteroy, Norway

[22] Filed: March 24, 1971

[21] Appl. No.: 127,787

Related U.S. Application Data

[63] Continuation of Ser. No. 764,343, Oct. 1, 1968, abandoned.

[30] Foreign Application Priority Data

Oct. 2, 1967 Norway..........................169,934
Sept. 6, 1968 Norway..........................3464/68

[52] U.S. Cl.....................99/122 R, 99/54, 99/60, 99/63
[51] Int. Cl. ..............................................A23d 3/02
[58] Field of Search............................99/60, 63, 122

[56] References Cited

UNITED STATES PATENTS

| | | | |
|---|---|---|---|
| 2,923,628 | 2/1960 | Otto | 99/63 |
| 1,941,261 | 12/1933 | Hellerud | 99/63 X |
| 2,526,302 | 10/1950 | Turgasen | 99/122 |
| 3,488,198 | 1/1970 | Bundus | 99/63 |

OTHER PUBLICATIONS

Bratland, A., The Preparation of Reconstituted Milk or Cream, Chemical Abstracts Vol. 65 12/1966 (P. 19230) QD1A51C2
Norman, G. H., Dried Buttermilk Improves Palatability of Reconstituted Milk. The Milk Products Journal, Vol. 46, No. 1 1955 (pp. 38–39)
McDowall, F. H., The Buttermakers Manual, New Zealand University Press, New Zealand, Vol. 2 1953, (pp. 1055–1060) SF263M25

*Primary Examiner*—Lionel M. Shapiro
*Assistant Examiner*—David M. Naff
*Attorney*—Kenyon & Kenyon Reilly Carr & Chapin

[57] ABSTRACT

A process for preparing foodstuffs such as cream substitutes, margarine and the like involving emulsifying fat and fat-poor milk constituents containing membrane substances that enclose the fat globules in milk.

9 Claims, No Drawings

PREPARATION OF FOODSTUFFS CONTAINING A HIGH CONTENT OF EMULSIFIED FAT

This application is a continuation of application Ser. No. 764,343, filed Oct. 1, 1968, now abandoned.

The invention concerns a process for the production of foodstuffs with a high content of emulsified fat and of fat-free milk constituents.

The success of the efforts made to improve the quality of livestock, and of livestock feed, has resulted in constantly increasing yields. Not only has milk production in itself risen, but the fat content of the milk has increased in line with the goals set by the industry from decade to decade. The already saturated market is being supplied with more and more milk and milk fat, without a simultaneous increase in consumption.

While production rises constantly, sales often show a falling tendency, to the detriment of the farming industry.

What must be done to improve conditions for dairy farming is to compensate for the discrepancy due to unsatisfactory consumption levels, to increase the consumption of milk and milk fat, and to reconsider the question of fat content in order to re-establish confidence in the importance of milk products in the diet.

To a constantly increasing degree the consumer adjusts his eating habits to what he considers to be an "up-to-date" diet. The overwhelming amount of factual information made available has already led to extensive changes in our assessment of the value of various foodstuffs. The reassessment now taking place concerns itself specially with animal fats.

The fat complex is one of the major categories of the nutritious components in our diet. In considering this complex we must first look at the essential fatty acids. These fat constituents cannot be built up by the human body, they must be supplied to the organism in the diet.

The essential fatty acids are the poly-unsaturated fatty acids. They occur in natural form, in oils and fat, as linoleic acid, linolenic acid and arachidonic acid. Whereas linolenic and arachidonic acids occur relatively seldom, many vegetable oils are very high in linoleic acid. This acid has the highest biological activity of the essential fatty acids, and is indispensable to normal metabolism. The essential fatty acids perform a regulating function in the fat economy of the body, they are the building bricks of cell membranes, and are important constituents in various enzyme systems. Linoleic acid prevents the fat level of the blood from rising above normal limits, and can even lower fat levels that are already too high. These specific qualities are sufficient to indicate that the essential fatty acids are of decisive importance to the human organism.

There is general agreement among experts that the essential fatty acids should make up at least 1.5 – 1.8 percent of the solids in our diet. This would give a daily requirement of approximately 8.10g. According to another method of calculation the daily requirements of an adult are approximately 4 percent of the total number of calories. If the total daily intake of calories is 2,500, the consumption of essential fatty acids should be 12 g. Butter contains approximately 3 percent essential fatty acids, and margarine approximately 18 percent. In view of the fact that the daily requirements of essential fatty acids are approximately 10 g per capita, it would seem of interest to investigate the extent to which the content of essential fatty acids in the edible fats butter or margarine make it possible for them to satisfy the whole daily requirements of essential fatty acids, calculated on the basis of their share of the market.

In 1963 the total per capita consumption of fats and oil in the German Federal Republic was 28.36 kg. Butter consumption was 9.04 kg, or 31.87 percent, against a margarine consumption of 9.54 kg, or 33.64 percent. Calculating on daily requirements of 10 g, this means annual per capita requirements of 3650 g essential fatty acids. If the share of the market held by butter is 31.87 percent, this would mean that butter would have to supply 1163 g essential fatty acids per capita each year. In actual fact, the butter consumption of 9.04 kg, with a content of 3 percent, gave only 271 g essential fatty acids, or a shortage of 862 g on the basis of the percentage of supply.

Margarine, with 33.64 percent of the market, should have supplied 1,226 g essential fatty acids. Its content of 18 percent essential fatty acids results in a supply of 1717 g per capita per year, or 490 g more than necessary in order to cover its percentual share or requirements.

This camparison makes it obvious that the content of essential fatty acids in butter, i.e., in milk fat, is absolutely inadequate. To compensate for the above-mentioned shortage the content of essential fatty acids in milk fat would have to be increased to 10 – 15 percent. This is necessary from the point of view of the physiology of nutrition and would again make butter an ideal fat, and a synonym for the highest fat quality.

The present composition of milk fat is:
61 percent saturated fatty acids
36 percent mono-unsaturated fatty acids and only
3 percent poly-unsaturated (essential) fatty acids.

Butter would again become an ideal fat if the distribution of fatty acids were changed to give a composition of:
50.5 percent saturated fatty acids
35.5 percent mono-unsaturated fatty acids and
14.0 percent poly-unsaturated (essential) fatty acids.

An increase of the essential fatty acids from 3 percent to 14 percent would lead to a decisive improvement in the quality of all fatty milk products, particularly as it would mean a simultaneous reduction in the content of saturated fatty acids — some of them very indigestible — in milk fat from the present very high level of 61% to approximately 50%.

It has been known that cream substitutes are produced out of animal or vegetable fats, skimmed milk and emulsifier. Even though cream substitutes have little or no scope in Norway at the moment, such whippable mixtures are marketable for example in the U.S.A., where a portion or preferably all the milk fat is replaced preferably by vegetable fat. These products are intended as diet foods, especially for persons who have a high cholesterol count in the blood or who for other reasons are not expected to take milk fat. Often, such mixtures have flavoring materials added thereto such as sugar and vanilla, and are then readily packed in aerosol boxes for direct squirting out of the box as the ready cream.

Such cream substitute products can also be of interest as coffee creams for certain diet patients who suffer from diseases in which certain types of fat are not tolerated by the organism.

The conventional process for producing such cream substituents is to mix together the ingredients in the desired mutual relative amounts and to subject the mixture to a light homogenization in order to avoid rapid separation of the fat.

In the production of margarine there is also used the addition of milk and emulsifier, which are kneaded into the fat mixture. In certain more expensive types of margarine, cream is also used to improve the taste.

A main object of the present invention is to improve such mixtures of fat and fat-free milk ingredients, so that their flavor is raised more closely to that of the product for which they are to serve as a substitute. A further object of the invention is to provide an improved consistency for the products.

The invention is based upon the discovery that the taste of such fat-containing products is determined only to a small extent by the type of fat they contain. Instead, the membrane or film which normally surrounds each of the fat particles in the emulsion is substantially more important. If therefore a substitute product is to be produced having a taste as close as possible to that of the genuine product, one must endeavour to maintain the materials in this film or membrane as near as possible up to that of the original product.

The invention thus relates to a process for producing foodstuffs having a high content of emulsified fat and a content of fat-poor milk ingredients, The process includes the steps of mixing a fat and a skimmed milk and is characterized in that the fat is emulsified preferably in a heated condition in an amount which does not exceed 8 percent by weight of the skimmed milk, and in that this mixture is thereafter subjected to division into a fat-poor and a fat-rich fraction.

Preferably the mixture is subjected to homogenization. It is also preferred to adjust the fat content of the skimmed milk ingredient between 2 and 4 percent by weight.

The fat-poor fraction can either be sold as skimmed milk for consumption or can be converted to dried milk in a manner well-known The division of the mixture into fat-poor and fat-rich fractions is such as to maintain the fat content in the fat-poor fraction as low as possible. In this way, the taste of the fat-poor fraction will generally not acquire the taste of the non-milk fat which has been emulsified in.

In order to effect the division of the mixture by centrifuging, which is preferred, it will be natural to adjust the fat content of the fat rich fraction to that which is usually used for cream. Thus, whippable cream can be produced having a fat content of 35 percent, or coffee cream having a content of 20 percent.

In the production of margarine, a cream as first produced as above which is then subjected to a churning process as is known so as to result in a margarine having a consistency and taste which lies very near to natural butter.

If for one or other reason, for example directions in butter mixing, it is desirable to have a certain amount of milk fat present in the margarine, either a proportion of the original skimmed milk can be replaced with normal milk, or the fat-rich fraction can be mixed with cream of the same or another fat content as the fraction.

The present invention proposes an emulsification with fatty substances at temperatures preferably between 30°– 100° C, followed by the usual churning process. This will permit the use of the membrane substances of the milk (the membranes that enclose the fat globules).

The invention is further characterized by the production during emulsification of a cream-like product with a fat content of approximately 8 –70 percent. The invention is also characterized by the following: Water and solids and/or milk or milk products with a natural content of water are used in emulsification; the content of membrane substances in the milk and/or milk product is enriched, and subsequently emulsified; the enrichment of the content of membrane substances is brought about by centrifuging at high speed (clarifixation) on which free milk fat will be separated out. Centrifuging should preferably be carried out at speeds of 100-200 m/sec. According to the invention the enrichment of the membrane substance content can also be brought about by churning or clarifixation and churning. Finally the invention calls for an enrichment of the membrane substance content by emulsification of a milk product of low membrane substance content with fatty substances, followed by clarifixation or churning. Emulsification with fatty substances prior to clarifixation or churning increases the fat content in milk products of low membrane substance content by up to 0.5 to 8 percent.

The invention will now be illustrated by a number of examples, which are intended to serve to clarify the invention, although not to limit it, since the invention can be carried out in many different ways within the scope of the appended claims.

EXAMPLE 1

3 kg of a vegetable fat mixture based on palm oil was mixed into 100 liters of skimmed milk and stirred well together. After heating to 55° C this mixture was led through a pressure homogenizer at a pressure of about 60 kg/cm². After homogenization the mixture was subjected to centrifuging. The centrifuge was adjusted to give a fat rich fraction mixture which contained 35 percent fat. The cream-like mixture which obtained which had a pronounced cream flavor.

After cooling and ripening the mixture was whipped, while sugar and vanilla were added. A cream obtained having a volume increase of 110, a whipping time of 110 seconds and a serum formation of 2 ml/100 ml unwhipped mixture after 2 hours. The taste was not to be distinguished from the cream of normal whipping cream.

EXAMPLE 2.

2 kg of a conventional fat mixture for margarine was melted at about 35° C and thoroughly mixed into a mixture of 100 liters of skimmed milk and 25 liters of natural milk. The mixture was heated further to 55° C while vigorously stirred and at this temperature led into an homogenizer which operated at a pressure of 70 kg/cm². After homogenizing the mixture was subjected to centrifuging so that a cream-like fat-rich fraction mixture having a fat content of 34.5 percent was obtained. The mixture had a pronounced cream flavor. As coffee cream it had the same whitening ability as whipping cream.

After cooling and ripening the mixture was whipped, after the usual addition of sugar and vanilla. The mixture had a whipping time of 100 seconds, a volume increase of 110, and serum formation of 1 ml/100 ml unwhipped mixture. The cream had the same typical consistency as cream from genuine whipping cream. It appeared slightly stiffer than the cream according to example 1, something which was possibly due to a wider melting interval with the fat mixture which was used in example 1.

EXAMPLE 3.

2.5 kg of a vegetable fat mixture on the basis of a soya oil, a mixture which was specially compunded to give a broad softening interval to margarine produced from such a mixture, was thoroughly mixed into 100 liters of skimmed milk. After heating to 55° C the mixture was led into a pressure homogenizer which operated at a pressure of 80 kg/cm$^2$. After this a mixture having a 36 percent fat content was centrifuged out.

The mixture also had a strong cream-like taste and consistency, and had excellent whitening ability used as coffee cream.

After cooling and ripening the mixture was whipped. The whipping time was 130 seconds, and the volume increase 100 percent. The serum formation was 4 ml/100 ml of the unwhipped mixture. The cream had the same short consistency as cream from genuine whipping cream, but appeared slightly softer. The ability was satisfactory per se, but somewhat worse than the stability of conventional whipping cream.

EXAMPLE 4

The same mixture ratio was used between fat, skimmed milk and if desired natural milk (example 2) and the same temperatures and degrees of homogenization for three tests as in the examples 1, 2 and 3, but the mixture was adjusted to 20 percent fat after separating out. In all three cases this mixture was fully satisfactory as coffee cream.

EXAMPLE 5

To the fat-rich mixture having 35 percent fat according to example 1 was added an acidifying agent, and after acidifying churned. A margarine was obtained having a flavor and consistency very close to that of natural butter, but the margarine remained submissive at substantially lower temperatures than butter.

EXAMPLE 6

The fat-rich mixture having 35 percent fat according to example 1 was mixed in the ratio 4:1 with whipping cream, and thereto was added an acidifying agent and churned after acidifying. Here also there was obtained a consistency very close to that of natural butter. Where the margarine obtained according to example 5 was distinctly whiter than natural butter, the color of this example was somewhat more golden and more resembled the color of natural butter. The margarine was completely free of the drawbacks which a conventional butter mixture having 20 percent butter mixed in has.

EXAMPLE 7

The fat-rich mixture from example 2 having 34.5 percent fat was churned by a "sweet" churning process. A margarine was obtained having a flavor and consistency which could scarcely be distinguished from that of natural butter. The color was somewhat lighter than natural butter.

EXAMPLE 8

Example 7 was repeated, but before mixing together the skimmed milk and the fat mixture an authorized buttercolorant was added to the fat. The margarine obtained was in all ways scarcely distinguishable from genuine natural butter.

EXAMPLE 9

To the fat-rich mixture from example 3 having 36 percent fat was added an acidifying agent and churned after acidifying. A margarine was obtained having an exellent flavor and consistency, which remained submissive even at the temperature of a refrigerator. The color was light.

EXAMPLE 10

Milk with a fat content of 2 – 7 percent is placed in a clarifixator. A clarifixator is a centrifugal separator in which 80 – 100 percent pure milk fat is extracted from the fatty phase by means of the breaking down of the bond between the globules of milk fat and the membrane which encloses them. This membrane consists of a protein phospholipoid complex and a triglyceride fraction with a high melting point. The membrane substances combine with the separated skimmed-milk or serum fraction to give a fat content of between 0.03 and 2 percent. This skimmed-milk serum, with its increased content of membrane substances, is now emulsified with vegetable fat or a mixture of vegetable and animal fat. This emulsification will produce a cream-like product with a fat content of between 8 – 70 percent, preferably between 10 – 60 percent. This cream-like product is then churned by one of the existing churning methods, giving buttermilk and a butterlike edible fat that in appearance and taste is indistinguishable from real butter, differing from real butter only in its fatty acid spectrum.

EXAMPLE 11

Cream with a fat content of 8 – 70 percent, preferably between 10 – 60 percent, is put into a clarifixator, The result will be 80 – 100 percent free milk fat and a serum with a fat content of 0.03 – 1.5 percent. This serum is then emulsified, as described in Example 10, with vegetable fats or a mixture of vegetable and animal fats. This cream, which will have a fat content corresponding to that in Example 10, will be further processed as described there.

EXAMPLE 12

Buttermilk resulting from churning of fresh or sour milk, with a fat content of between 0.5 – 1 percent is emulsified with fats, as described in Example 10, the resulting cream being churned.

EXAMPLE 13

Buttermilk and skimmed milk are emulsified with fats, as described in Example 10, the resulting cream being further processed as described above.

EXAMPLE 14

Buttermilk, skimmed milk and whole milk are emulsified with fats, as described in the previous examples 10 – 13, the resulting produce being further processed as described above.

EXAMPLE 15

The serum produced according to Examples 10 and 11, cream with a fat content of 8 – 70 percent, buttermilk, whole milk and skimmed milk are emulsified with fats as in the above-mentioned Examples 10 and 11 and further processed.

EXAMPLE 16

Skimmed milk is emulsified with fats as in the above-mentioned examples and the resulting milk-like substance, with a fat content between 0.5 – 8 percent, is placed in a clarifixator and separated into a 80 – 100 percent free milk fat and a serum with a fat content between 0.03 – 2 percent. In this process the membrane substances of the skimmed milk are extracted by means of fats. The resulting serum is further processed as described in Examples 10 and 11.

EXAMPLE 17.

Serum powder, buttermilk powder, whole milk powder, skimmed milk powder, cream powder, vegetable fat and milk fat are emulsified with water, and the resulting cream, which has a fat content of between 8 – 70 percent, is churned as described above.

The butter-like product produced in Examples 10 – 17 cannot be distinguished from real butter in appearance, smell or taste. It is within the scope of the invention that it is possible to achieve, by the choice of the fats used in the emulsification process, any desired consistency of edible fat, an important consideration in extreme climatic conditions. The distribution of fatty acids (the fatty acid spectrum) can be adapted to the most widely differing requirements, especially with regard to dietary requirements. As already mentioned, it is an important feature of the invention that due consideration has been paid to the fact that the taste of the finished product depends materially on the presence of the membrane substances of the milk. In these circumstances a free choice is possible with regard to the pure fats to be used in the emulsification process, as these fats are practically tasteless. A wide range of original products is suitable for use in this process. In the reconstitution process widely differing milk-like products can be produced and employed.

The described membrane-enriched serum can also be produced from butter, by melting the butter and extracting the serum by centrifuging. Serum produced in this manner has a high content of membrane substances and can be emulsified with other milk constituents, such as fat, as described in he examples given above.

The process described by the invention can also include the addition, as required, of various emulsifying and stabilizing agents, for instance 0.5 percent glycerolmonosterate or one or more mono- or diglycerides. Vitamin preparations can also be added in the course of the described processes, in order to give the finished product the desired vitamin content.

What is claimed is:

1. A process for preparing foodstuffs with a high content of emulsified fat and a content of non-fatty milk constituents consisting of the steps of clarifixating with a centrifugal separator a milk having a fat content of from 2 percent to 7 percent to break down the bond between the globules of milk fat and the membrane substance surrounding said globules, said membrane substance comprising a phospholipoid complex and a triglyceride fraction, said clarifixating separating said milk into a high fat fraction containing a fat content of from 80 percent to 100 percent pure milk fat and a low fat fraction containing a fat content of from 0.03 percent to 2 percent and having said membrane substance therein;

mixing said membrane substance containing low-fat milk fraction with a fat obtained from the group consisting of vegetable fat and a mixture of animal and vegetable fat together, said fat being sufficient to obtain a cream product with a fat content in the range of from 8 percent to 70 percent by weight;

emulsifying the mixture of the membrane substance containing low-fat milk fraction and fat at a temperature of from 30° to 100° C; and subsequently churning the emulsified mixture and separating buttermilk to produce a butter like product.

2. In a process as set forth in claim 1 wherein said vegetable fat is obtained from vegetable oil.

3. In a process as set forth in claim 1 wherein said step of emulsifying is effected by homogenization at a predetermined pressure.

4. In a process as set forth in claim 3 wherein said pressure is from 60 to 70 kilograms per square centimeter.

5. In a process as set forth in claim 1 wherein said emulsified mixture has a fat content of from 10 percent to 60 percent by weight.

6. A process for preparing foodstuffs with a high content of emulsified fat and a content of non-fatty milk constituents consisting of the steps of clarifixating with a centrifugal separator a cream having a fat content of from 10 percent to 60 percent to break down the bond between the globules of milk fat and the membrane substance surrounding said globules, said membrane substance comprising a phospholipoid complex and a triglyceride fraction, said clarifixating separating said cream into a high fat fraction containing a fat content of from 80 percent to 100 percent pure milk fat and a low fat serum fraction containing a fat content of from 0.03 percent to 1.5 percent and having said membrane substance therein;

mixing said membrane substance containing low-fat serum with a fat obtained from the group consisting of vegetable fat and a mixture of animal and vegetable fat together, said fat being sufficient to obtain a cream product with a fat content in the range of from 8 percent to 70 percent by weight;

emulsifying the mixture of the membrane substance containing low-fat serum and fat at a temperature of from 30° to 100° C; and subsequently churning the emulsified mixture and separating buttermilk to produce a butter like product.

7. In a process as set forth in claim 6 wherein said cream has a fat content of from 30 percent to 40 percent by weight.

8. In a process as set forth in claim 7 wherein said cream has a fat content of from 34 – 36 percent by weight.

9. A process for preparing foodstuffs with a high content of emulsified fat and a content of non-fatty milk constituents consisting of the steps of melting butter;

centrifuging the melted butter to break down the bond between the globules of milk fat and the membrane substance surrounding said globules, said membrane substance comprising a phospholipoid complex and a triglyceride fraction, said centrifuging separating said melted butter into a high fraction containing pure milk fat and a low fat serum fraction containing a fat content of from 0.03 percent to 2 percent and having said membrane substance therein;

mixing said membrane substance containing low-fat serum fraction with a fat obtained from the group consisting of vegetable fat and a mixture of animal and vegetable fat together, said fat being sufficient to obtain a cream product with a fat content in the range of from 8 percent to 70 percent by weight;

emulsifying the mixture of the membrane substance containing low-fat serum and fat at a temperature of from 30° to 100° C; and subsequently churning the emulsified mixture and separating buttermilk to produce a butter like product.

\* \* \* \* \*